United States Patent [19]

Stahl

[11] 3,989,277
[45] Nov. 2, 1976

[54] MOTOR HOME SUPPORT

[76] Inventor: Patrick H. Stahl, 3986 Twining, Riverside, Calif. 92509

[22] Filed: July 28, 1975

[21] Appl. No.: 599,650

[52] U.S. Cl. .............................. 280/764; 212/145
[51] Int. Cl.² ..................................... B60R 27/00
[58] Field of Search ............... 280/150.5, 763, 764, 280/765; 212/145; 248/352

[56] References Cited
UNITED STATES PATENTS

| | | | |
|---|---|---|---|
| 1,868,971 | 7/1932 | Davis | 280/150.5 |
| 3,281,160 | 10/1966 | Vinther et al. | 280/150.5 X |
| 3,854,750 | 12/1974 | Voehringer, Jr. | 280/150.5 |
| 3,870,276 | 3/1975 | Phillips | 280/150.5 X |

Primary Examiner—Robert R. Song
Assistant Examiner—Michael J. Forman
Attorney, Agent, or Firm—Harvey S. Hertz

[57] ABSTRACT

A motor home support for preventing horizontal and vertical sway of a motor home. A vertical mounting plate has a fixed horizontal arm secured thereto. A rotatable screw whose axis extends parallel to the axis of the horizontal arm is secured adjacent to the horizontal arm and has a movable nut positioned thereon. A planar ground support plate is movable from adjacent one end of the arm to a position wherein the ground support plate is in a plane generally parallel to the plane of the horizontal arm. A pivot junction is fixed to one side of the ground support plate. A first support leg interconnects the mounting plate and the ground support plate. A second support leg is interconnected at one end to the ground support plate and the other end to the movable nut.

5 Claims, 6 Drawing Figures

MOTOR HOME SUPPORT

BACKGROUND OF THE INVENTION

1. Field of the Invention

The field of art to which the invention pertains includes the field of motor home supports, particularly with respect to an anti-sway support for preventing both horizontal as well as vertical movement of a motor home.

2. DESCRIPTION OF THE PRIOR ART

Conventional motor home supports provide a vertical support for a motor home which enables the motor home to be supported on uneven ground. However, when a person enters or leaves the motor home, or when wind exerts a horizontal force movement on the motor home, undesirable swaying of the home can occur.

Known prior arts include U.S. Pat. Nos. 3,083,049; 3,104,891; 3,281,160; 3,801,068; and 3,874,696.

In order to overcome the attendant disadvantages of the prior art motor homes, the present invention provides anti-sway device for providing both support in the vertical as well as the horizontal planes. The present invention can be permanently secured to a motor home and easily adjustable when the motor home is positioned for either short or long durations of time. Each support is independently adjustable so that the home can be secured in campgrounds having non-level contours. The motor home support is easily movable to a transportable position wherein the support remains fixed to the motor home yet is clear of the ground when the motor home is on the road or highway.

SUMMARY OF THE INVENTION

A motor home support contains a vertical mounting plate having a fixed horizontal arm secured thereto. A rotatable screw whose axis extends parallel to the axis of the horizontal arm is secured adjacent to the horizontal arm and has a movable nut positioned thereon. A planar ground support plate is movable from adjacent one end of the arm to a position wherein the ground support plate is in a plane generally parallel to the plane of the horizontal arm. A pivot junction is fixed to one side of the ground support plate. A first support leg interconnects the mounting plate and the ground support plate. A second support leg interconnects at one end to the ground support plate and at the other end to the movable nut.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
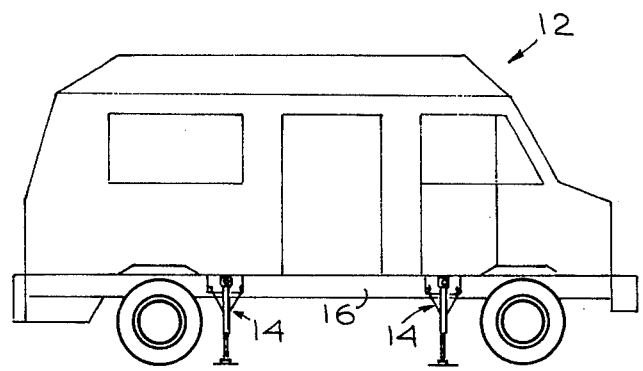
FIG. 1 is a perspective view of a motor home having a plurality of supports secured thereon.
Figure 2:
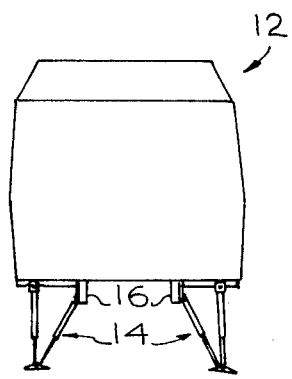
FIG. 2 is an end view of the motor home illustrating the position of the supports.

Referring now to the drawings, there is shown in FIG. 1, a conventional motor home 12 which utilizes a plurality of motor home supports 14 in order to prevent vertical as well as horizontal sway when the motor home is positioned in a campground or other facility. FIG. 1 illustrates a pair of motor home supports 14 being secured to one side of the chassis frame 16 of the motor. Normally a second pair of motor home supports can be secured to the opposite side of the chassis frame. As shown in FIG. 2, in the rear view of the motor home, the supports 14 are equally placed on opposite sides of the motor home. While the invention as shown in FIG. 1 illustrates four motor home supports for balancing the motor home, it should be understood that a single support could be utilized on one side of the motor home to provide a desired degree of support or that for larger sized motor homes, six or even more supports could be utilized as well.

Figure 3:
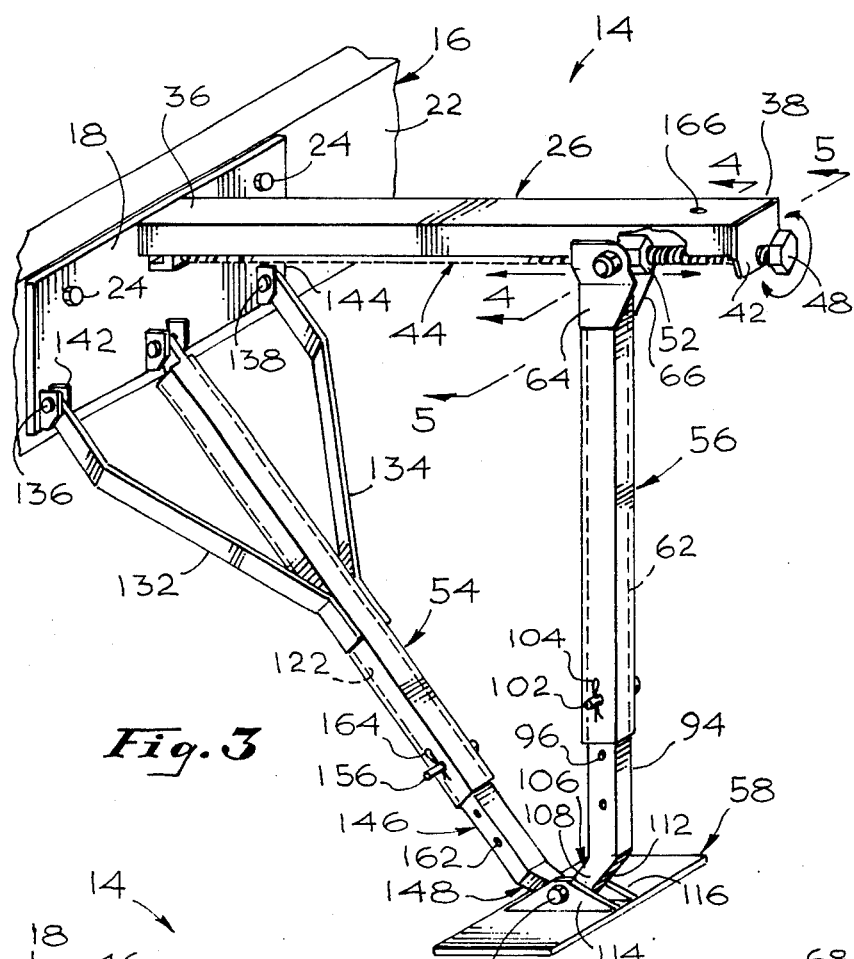
FIG. 3 is a perspective view of the motor home support in a support position.
Figure 5:
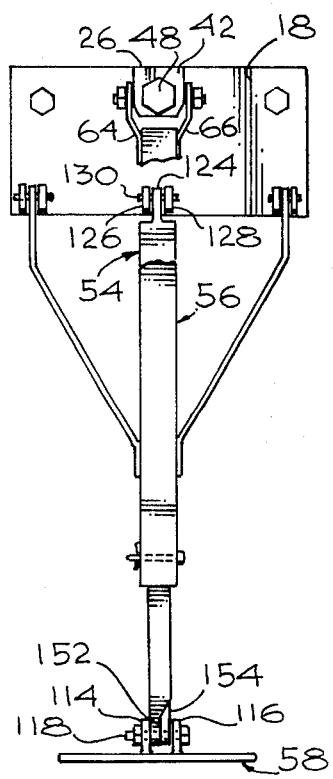
FIG. 5 is a cross-sectional view of the motor home support taken along the line 5—5 of FIG. 3.

Referring now to FIG. 3 there is shown a perspective view of one of the motor home supports, expanded to the support position. The motor home support 14 contains a vertical plate 18 which is secured to a vertically extending surface 22 of the chassis frame 16 by means of a plurality of bolts 24. The bolts 24 enable the support to be removed from the chassis frame 16 should it be desirable or necessary. Alternatively the vertical plate can be welded or otherwise secured to the chassis frame for a permanent installation thereon.

The support 14 further comprises a U-shaped fixed horizontal arm 26 whose axis is perpendicular to the plane of the vertical plate 18. The horizontal arm 18 comprises a top surface 28 and a pair of downwardly extending side walls 32 and 34. The horizontal arm 26 is welded or otherwise secured to the vertical plate 18 at a first end 36 and a second end 38 contains an end plate 42 which is secured to the ends of the top wall 28 and side walls 32 and 34. A rotatable screw 44 extends along the axis of the horizontal arm parallel thereto and directly below the free ends of the side walls 32 and 34. One end of the rotatable screw 44 is rotatably positioned to a plate 46, the plate 46 in turn being fastened to the vertical plate 18 directly below the horizontal arm 26. The other end of the rotatable screw 44 extends through the end plate 42 at the second end of the horizontal arm 26 and has a hexagonally shaped bolt head 48 secured thereon for enabling the screw 44 to be rotated as shown by the arrows. Typically, the bolt head 48 can be rotated by means of a conventional wrench 50 (see FIG. 6) or a lug wrench. A movable nut 52 is positioned on the rotatable screw 44 and moves on the rotatable screw 44 along the length of the horizontal arm 26 when the bolt head 48 is rotated.

The motor home support 14 further contains a first support leg 54 and a second support leg 56. The first support leg is interconnected between the vertical plate 18 and a ground support plate 58. The second support leg 56 is connected at one end to the cylindrical movable nut 52 and at the other end to the ground support plate 58.

Figure 4:
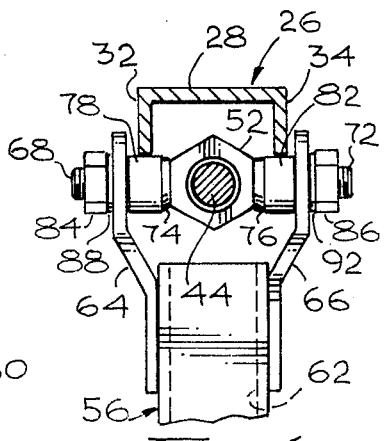
FIG. 4 is a side view of the motor home support in the position of FIG. 3 taken long the line 4—4 of FIG. 3.

The second support leg is formed of a generally square hollow central portion 62. As can be seen in FIG. 4, the end of the second support leg hollow portion 62 adjacent the cylindrical movable nut 52 contains a pair of side arms 64 and 66 which flare outwardly on opposite external sides of the horizontal arm side walls 32 and 34, respectively.

A pair of bolts 68 and 72 have their respective heads 74 and 76 welded or otherwise secured to one of the vertically extending surfaces of the movable nut 52. The bolts 68 and 72 then extend through the side arms 64 and 66, respectively. Spacers 78 and 82 are positioned intermediate the bolts heads 74 and 76 respectively and the interior surface of one of the respective side arms 64 and 66. The bolts 68 and 72 are then secured by means of nuts 84 and 86 to the exterior surface of the side arms 64 and 66. Additionally, washers 88 and 92 can be positioned between the nuts 84 and 86, respectively, and the exterior surface of the side arms 64 and 66. The bolts 68 and 72 form a pivotable connection between the end of the second support leg and the nut 52 enabling the second support leg 56 to be movable along the rotatable screw 44 and pivot therewith.

Referring again to FIG. 3, the second support leg 56 connection to the ground support plate 58 includes a telescopic portion 94 of generally square configuration whose outer dimensions are slightly smaller than the interior dimensions of the central hollow portion 62 enabling the telescopic portion 94 to be slidably movable therein. Openings 96 in a pair of opposed sides of the telescopic portion 94 are alignable with openings 98 in the hollow portion 62 enabling a pin 102 to be inserted through aligned openings in both the hollow portion 62 and the openings 96 in the telescopic portion 94.

A cotter pin 104 can be utilized to prevent removal of the pin 102 from the hollow portion 62 and the telescopic portion 94 enabling the hollow portion 62 and telescopic portion 94 to be fixed in a desired position. The end of the telescopic portion 94 extending outwardly from the hollow portion 62 has an angled arm 106 formed of a pair of side walls 108 and 112 which form extensions of two of the opposed side walls of the telescopic portion 94 having the openings 96 formed therein.

The ground support plate 58 has a pair of triangularly shaped spaced apart parallel flange members 114 and 116. The flange members extend upwardly from the top surface of the support plate 58 and contain a pivot pin 118 extending transverse to the planes of the flanges members. The side walls 108 and 112 are spaced intermediate the flange members 114 and 116 and are fastened to the pivot pin 118 enabling the second support leg to pivot with respect to the ground support plate 58.

The first support leg 54 is formed of an upper central hollow portion 122 which is pivotable connected at one end to the vertical plate 18. A central tab 124 extends from the end of the hollow portion 122 and is positioned between a pair of flanges 126 and 128 which are integrally connected to the vertical plate 18. The pivot pin 130 extends through the flanges 126 and 128 and the central tab 124 forming the connection as well as the pivot point for the tab 124.

Additional connection as well as support between the first support leg 54 and the vertical plate 18 is formed by a pair of angled arms 132 and 134 which extend outwardly from opposed sides of the first support leg hollow portion 122. The free ends of the angled arms 132 and 134 are also pivotally connected to the vertical plate 18 by means of pins 136 and 138 which extend through a first pair of first arm flanges 142 and a second pair of second arm flanges 144, respectively.

The first support leg 54 is also pivotably connected to the ground support plate 58 in a manner similar to that of the second support leg 56. A first support leg telescopic portion 146 has an angled arm 148 extending from its free end which is formed of a pair of side walls 152 and 154. The arms 152 and 154 are pivotably connected to the pivot pin 118 intermediate the flange members 114 and 116. Thus, the first support leg 54 is pivotably connected to both the vertical plate 18 and the ground support plate 58.

The first support leg 54 also contains a telescopic connection between the hollow portion 122 and the telescopic portion 46 in a manner similar to that of the second support leg 56. A pin 156 extends through openings 158 in the hollow portion 122 as well as the openings 162 in the telescopic leg 146. Similarly, a cotter pin 164 secures the pin 156 thereon.

Figure 6:
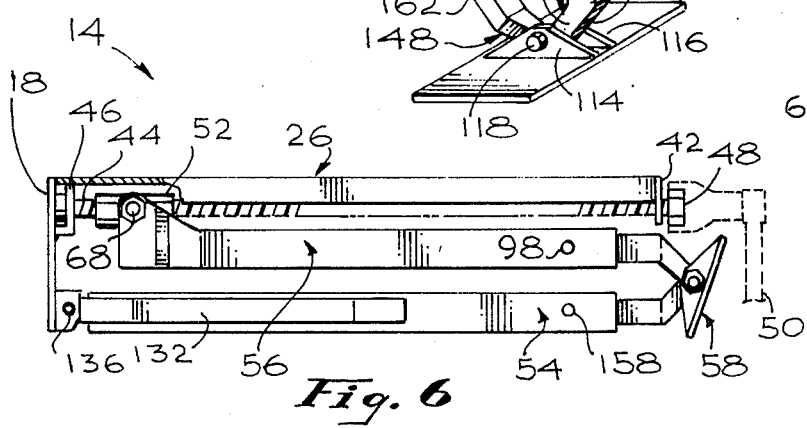
FIG. 6 is a plan view of the motor home support of FIG. 3 shown in a collapsed position.

Referring now to FIG. 6, the support 14 is illustrated in a closed position such as when the motor home 12 is being transported down a road or highway. When a campground or similar trailer site has been located and the motor home is at rest, the bolt head 48 is rotated causing the cylindrical movable nut 52 to move toward the bolt head 48 to a position shown in FIG. 3. When the second support leg 56 is in the approximate vertical position, the first and second support leg pins 156 and 102 are removed from their respective legs and the telescopic legs 146 and 94 are extended until the ground plate 58 bottom surface is adjacent the ground as is desired. The pins 156 and 102 are then returned to their respective legs and the support is in a desired position.

It should be noted that the ground support plate 58 can be pivoted about the pivot pin 118 for non-horizontal surfaces. After each of the supports 14 have been correctly positioned the home is now supportable for both vertical as well as horizontal component of movement of the home. When it is once again desired to move the home, the bolt head 48 is again rotated so that the support is in the position shown in FIG. 6 and, thus clear of any ground obstructions.

It should be further noted that an opening 166 is formed in the horizontal arm top plate 28 enabling the arm to be fastened to a support structure of the motor home should it be found necessary.

I claim:

1. In combination: a vehicle chassis including a frame having a vertical surface extending parallel to the longitudinal axis of said frame;

and a motor home support comprising: a vertical mounting plate having a fixed horizontal arm secured thereto adjacent the mounting plate top surface, said vertical mounting plate having a surface abutting and secured to said chassis frame vertical surface;

a rotatable screw whose axis extends parallel to the longitudinal axis of said horizontal arm and having a movable nut positioned on said screw, said screw having means formed thereon for rotating said screw;

a planar ground support plate movable from adjacent one end of said arm to a ground engaging position wherein said ground support plate is in a plane parallel to the plane of said horizontal arm;

a pivot junction fixed to one side of said ground support plate;

a first support leg pivotally interconnected between said mounting plate adjacent said mounting plate bottom surface, and said ground support plate at said pivot junction; and a second support leg pivotally interconnected at one end to said ground support plate at said pivot junction and at the other end to said movable nut.

2. A motor home support in accordance with claim 1 wherein said first and second support legs are movable from a position wherein said second support arm axis is generally perpendicular to the axis of said first horizontal arm to a collapsed position wherein said first and second support leg axes are generally parallel to the axis of said fixed horizontal arm.

3. A motor home support in accordance with claim 1 wherein said movable nut is adjacent said mounting plate when said support arm axes and said horizontal arm axis are in said parallel position.

4. A motor home support in accordance with claim 1 wherein said ground support leg is tiltable for adjustably mounting said ground support plate on a ground surface.

5. A motor home support in accordance with claim 4 wherein said support legs each contain telescopic portions for adjusting said support plate with respect to said ground surface.

* * * * *